(No Model.) 2 Sheets—Sheet 1.

F. A. MERRITT.
CORN SHUCKER.

No. 513,588. Patented Jan. 30, 1894.

Witnesses:-
M. P. Smith.
E. M. Fitzpatrick.

Inventor:-
Francis A. Merritt.
By Higson & Higson
Atty's.

THE NATIONAL LITHOGRAPHING COMPANY,
WASHINGTON, D. C.

(No Model.) 2 Sheets—Sheet 2.
F. A. MERRITT.
CORN SHUCKER.
No. 513,588. Patented Jan. 30, 1894.
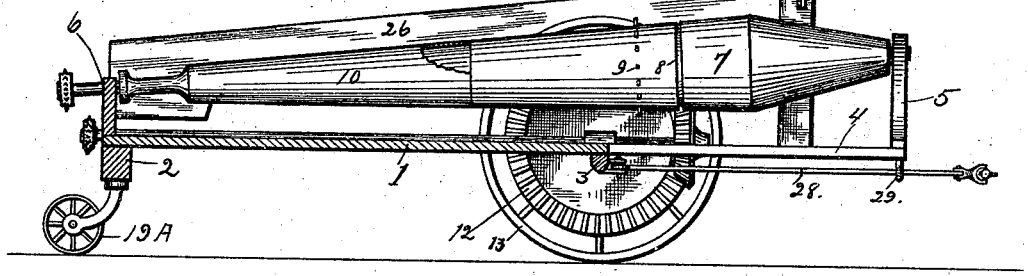
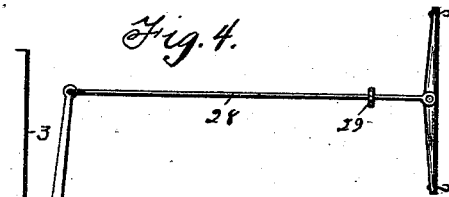
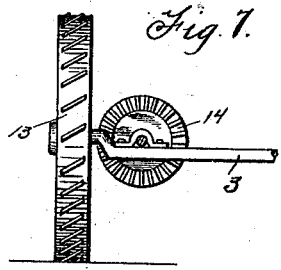
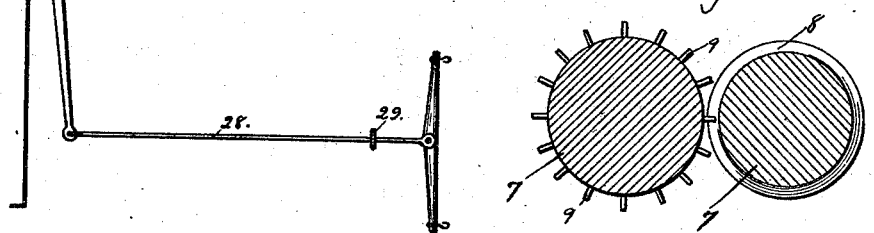
Witnesses:-
M. P. Smith.
E. M. Fitzpatrick.
Inventor.
Francis A. Merritt.
By Higdon & Higdon
Atty's

UNITED STATES PATENT OFFICE.

FRANCIS A. MERRITT, OF OSAWATOMIE, KANSAS.

CORN-SHUCKER.

SPECIFICATION forming part of Letters Patent No. 513,588, dated January 30, 1894.

Application filed September 12, 1892. Serial No. 445,717. (No model.)

*To all whom it may concern:*

Be it known that I, FRANCIS A. MERRITT, of Osawatomie, Miami county, Kansas, have invented certain new and useful Improvements in Corn-Shuckers, of which the following is a full, clear, and exact description, reference being had to the accompanying drawings, forming a part hereof.

The object of my invention is to produce a corn harvesting machine combining cheapness, simplicity and efficiency, that will break or pull the ear of corn from the stalk, husk it, and deposit it in a receptacle at the rear of the machine. I attain this object by mechanism illustrated in the accompanying drawings, in which—

Figure 1:
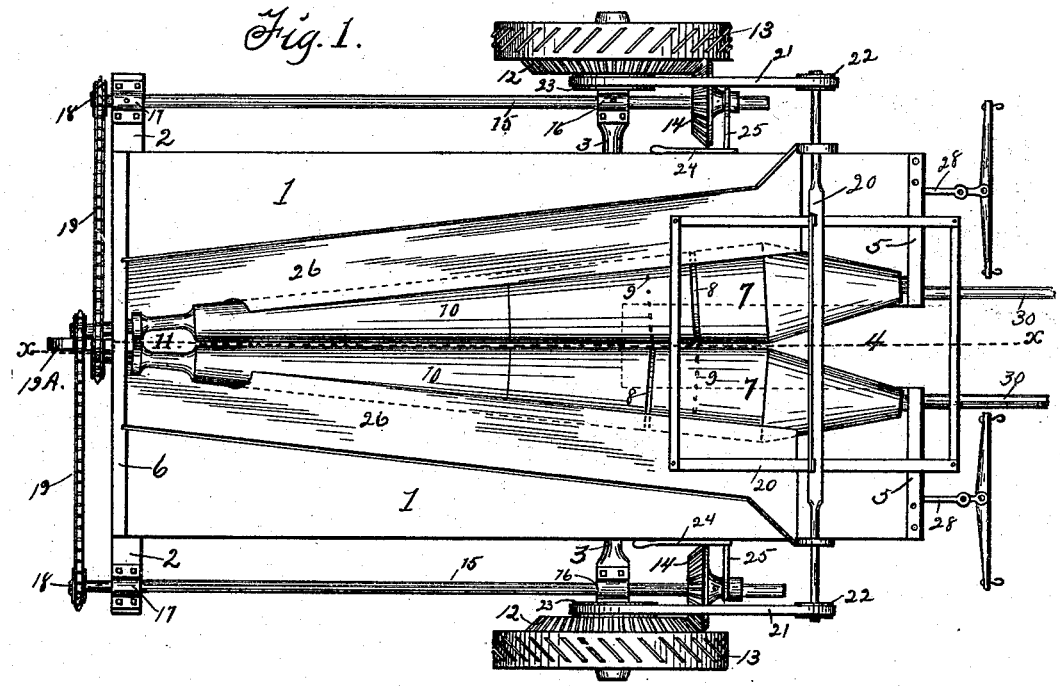
Figure 5:
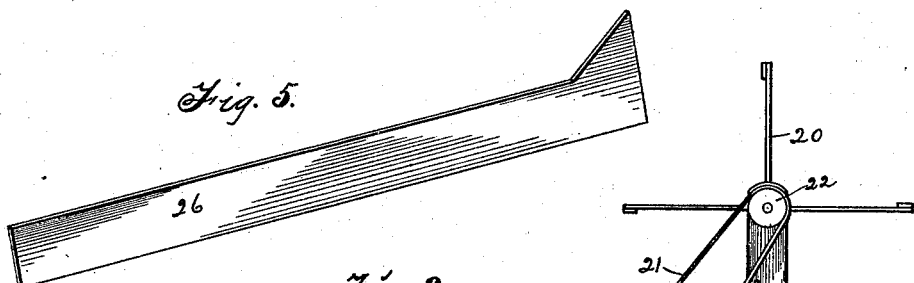
Figure 2:
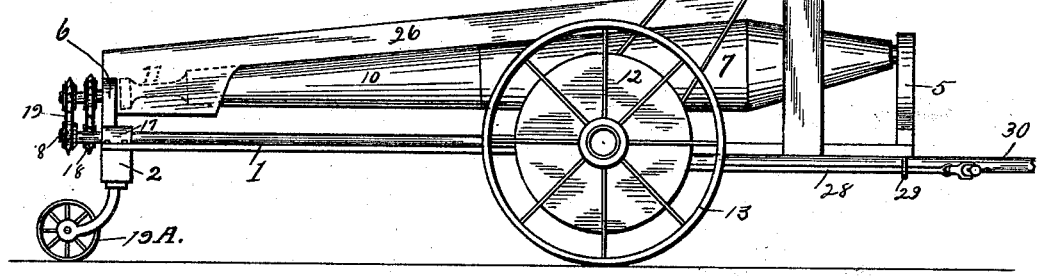

Figure 1, is a top plan view of my complete machine. Fig. 2, is a side view of the same. Fig. 3, is a vertical cross section view on the line X X of Fig. 1. Figs. 4, 5, 6, 7, and 8, are detail views of various portions of my machine.

The numeral 1 designates the platform of my machine, which at its rear rests on the cross piece, 2, and near its front end on the axle, 3. A recess 4, is arranged centrally of the platform 1, and extends from the front end of the platform, rearwardly to the axle 3. On either side of the recess, 4, and extending transversely of the end of the platform are uprights, 5 5, and at the rear end of the platform, is arranged transversely a single upright, 6. These pieces, 5, 5 and 6, serve as bearings for the husking rollers, 7 7, which lie side by side, extending the entire length of the machine. These husking rollers are cone shaped in two directions, the parts projecting forwardly being much shorter than the ones extending rearwardly. Near the forward end of each of these rollers 7, 7 is a groove, 8, and a series of pins, 9, arranged radially of, and entirely around the said rollers, the pins of the one roller engaging in the groove of the other. The rear portions of these rollers 7, 7 are covered with felt, rubber, or other suitable material, numbered 10, and are turned so as to form an opening, 11, where the ear of corn may drop through. Motion is imparted to these rollers through large bevel gear wheels, 12, which are attached to each main traction wheel, numbered 13. These bevel gear wheels mesh with smaller bevel gear wheels, 14, which slide loosely on a feather on the shafts, 15, journaled in bearing boxes, 16, 16, and extending rearwardly through bearings, 17, 17, mounted upon the cross piece, 2. On their outward extremities they have fixed sprocket wheels, 18, 18, over which run sprocket chains, 19, to sprocket wheels fixed at the rearward ends of the conical rollers, 7, 7. A caster wheel, 19$^A$, is fixed to the lower side of the cross piece, 2, and serves to support the rear weight of the machine.

A reel of ordinary form, 20, is located immediately over the front portions of the rollers, 7, and serves to guide the stalks of corn into the opening, 4, and between the rollers, 7, 7. Motion is imparted to this reel by belts, or sprocket chains, 21, 21, running over belt wheels, or sprocket wheels, 22, 22, fastened to the main shaft of the reel 20, and belt, or sprocket, wheels, 23, 23, formed on, or fixed to, the bevel gear wheels, 12. By a lever, 24, and arm, 25, the bevel gear wheel, 14, is slid along the shaft, 15, thereby throwing the rollers out of gear while not being used.

Side pieces, 26, for retaining the ears of corn upon the rollers, 7, are made of sheet metal, wood, or other suitable material, and fastened at the forward end to the reel support, and at the rear end to the upright, 6. Their lower portions at the rear ends are bent downward, and serve as a chute for the husked corn.

Fastened to the center of the axle, 3, is a double-tree, or evener, 27, at each end of which are secured rods, 28, which run through eyelets, 29, to a point in front of the machine, and there have attached to them the single trees.

Poles, 30, are fastened to the under side of the platform 1, and extend forward, to which are fastened the neck yokes of the horses.

It will be seen by Fig. 7, that the axle, 3, is dropped enough to allow the shaft, 15, carrying the bevel gear wheel, 14, to run horizontally on a center, with the main traction wheel.

The practical operation of my device is as follows:—The smaller gear wheels, 14, 14, are thrown in gear, and as the machine is started motion will be imparted to the reel, 20, by the belt, 21, passing over the belt wheels, 22 and 23. Also, motion is given to the husking rollers, 7, 7, by the bevel gear wheels, 12 and 13, shafts 15, 15, sprocket wheels, 18, 18, and sprocket chains 19, 19, which chains pass over the sprocket wheels on the ends of the husking rollers, 7, 7. By my method of running the sprocket chains to the husking rollers it will be seen that they rotate toward each other and toward the center. As the stalks of corn are brought by the reel 21 into the opening 4 they are caught by the rollers 7, 7, and carried downwardly. As an ear of corn is brought in contact with the rollers the space between said rollers being too small to admit the ear of corn, it is broken from the main stalk. The husking rollers being on an incline, the ear of corn is gradually worked backward until it strikes the rows of pins. These tend to loosen and tear the husk from the ear, and as it is worked back onto the rubber or felt covered portion of the husking roller the loosened husk is caught and carried through the rollers, and the husked ear carried on until it drops through the opening in the rollers at the rear of the machine. Here it is caught in a bag or basket, or other suitable receptacle. Thus will be seen the ease and dispatch with which my machine operates.

Having thus described my invention, what I claim as new, and desire to secure by Letters Patent, is—

A corn harvesting machine, comprising a wheeled frame, a horizontal platform mounted thereon, double cone-shaped rollers mounted upon said platform, having reduced portions to form an opening, and inclined guards or side pieces at each side of the rollers, having extensions at their rear ends to form a chute or guide for the shucked corn, substantially as set forth.

In testimony whereof I affix my signature in the presence of two witnesses.

FRANCIS A. MERRITT.

Witnesses:
W. M. MARTIN,
E. W. SMITH.